United States Patent [19]

Gubanc et al.

[11] Patent Number: 5,151,258

[45] Date of Patent: Sep. 29, 1992

[54] $NO_x$ REDUCTION AND CONTROL USING HYDROGEN PEROXIDE IN THE ABSORBER COLUMN

[75] Inventors: David M. Gubanc, Franklin; Larry J. Liston, Westerville; Jeffrey M. Zimmerman, Franklin, all of Ohio

[73] Assignee: General Electric Company, Worthington, Ohio

[21] Appl. No.: 708,135

[22] Filed: May 30, 1991

[51] Int. Cl.$^5$ ............................................. C01B 21/60
[52] U.S. Cl. .................................................. 423/235
[58] Field of Search .................... 423/235, 239 A, 239

[56] References Cited

U.S. PATENT DOCUMENTS 4,341,747 7/1972 Downey ............................. 423/235
4,603,036 7/1986 Bottom et al. ...................... 423/235

Primary Examiner—Gregory A. Heller
Attorney, Agent, or Firm—Millen, White & Zelano

[57] ABSTRACT

A method for reducing $NO_x$ emissions through the selective addition of hydrogen peroxide in the aqueous liquor of an absorber column, wherein periods of addition are determined by increases in temperature of the aqueous liquor.

10 Claims, 1 Drawing Sheet

NO$_x$ REDUCTION AND CONTROL USING HYDROGEN PEROXIDE IN THE ABSORBER COLUMN

BACKGROUND OF THE INVENTION

Oxides of nitrogen (NO$_x$) emitted from industrial processes can be controlled under most operating water absorber. However, occasionally, NO$_x$ evolves from industrial processes at extremely high rates for very short periods, which overwhelms the standard equipment, producing observable emissions for a short duration.

In batch metal dissolution processes using hot nitric acid, conventional methods for treatment and control of NO$_x$ emissions consist of: (1) passing the reactor effluent gases through a water absorber, (2) treating the reactor effluent gases with a caustic scrubber and/or (3) adding prilled urea to the reactor, which slows the reaction rate and associated NO$_x$ generation. Such treatment methods are used in addition to optimizing reactor conditions for dissolving metal to prevent or minimize a generation of NO$_x$.

It is inefficient to operate conventional treatment methods on a scale which accommodates for the peak evolution of NO$_x$, particularly in batch metal dissolution processes where, during much of the cycle, NO$_x$ evolution is moderate.

The use of chemical treatment agents in absorber columns to accommodate for the peak evolution of NO$_x$ from batch metal dissolution processes can be effective and will not affect the reaction rate. However, such methods are inefficient and unnecessarily costly if the treatment agent is fed continuously into the absorber column since scrubbing with water alone will remove substantially all NO$_x$ from emissions during most of the batch process. It is desirable to add chemical treatment agents only as needed, typically just prior to increases in NO$_x$ emissions.

NO$_x$ analyzers are available which monitor the concentration of the effluent components at the exhaust flue. These analyzers can detect increases in NO$_x$ emissions. However, these NO$_x$ analyzers are expensive and require significant maintenance in that they should be recalibrated every one to three days. Furthermore, the time to respond to the analyzer readings is very short in that the effluent which is monitored is almost outside of the flue. Observable NO$_x$ plumes can still be a problem and to avoid significant emissions of NO$_x$, the system must respond rapidly and excessively to any change in NO$_x$ concentrations which are detected. It is desirable to provide a method for removing the oxides of nitrogen (NO$_x$) from a gaseous effluent utilizing a control means which is simple and economical to operate and which provides adequate time to respond to increases in NO$_x$ emissions so as to avoid observable plumes of NO$_x$.

SUMMARY OF THE INVENTION

It is an object of the present invention to provide an efficient and economical method for removing the oxides of nitrogen (NO$_x$) from a gaseous effluent wherein a chemical treatment agent is added to the system in response to increases in NO$_x$ emissions.

It is another object of the present invention to reduce peak NO$_x$ emissions with an active chemical treatment agent that forms products which are not detrimental to the environment downstream of the treatment process.

It is another object of the present invention to provide a method for removing NO$_x$ from a gaseous effluent of a batch metal dissolution process without reducing the metal dissolution rate and efficiency of the process, wherein a chemical treatment agent is selectively added to the system at periods determined by conditions of the system consistent with high NO$_x$ emissions.

It is a further object of the present invention to provide a method of detecting increases in NO$_x$ emissions which provides adequate time to respond, i.e., more than 15 seconds, before the emissions exit the flue and form an observable plume.

Another object of the invention is to reduce the peak emissions without the use of urea in the reactor so as to improve the aggressiveness of the process by making acid more available to dissolve the metal.

The present invention provides a method for removing NO$_x$ from a gaseous effluent which comprises contacting the gaseous effluent with an aqueous liquor to which hydrogen peroxide has been selectively added at periods determined by the temperature of a portion of the aqueous liquor which has absorbed NO$_x$ from the gaseous effluent.

A preferred method for removing NO$_x$ comprises feeding a gaseous effluent and aqueous liquor into an absorber column, contacting the gaseous effluent with the aqueous liquor within the absorber column, discharging the gaseous effluent and aqueous liquor which have contacted and selectively adding hydrogen peroxide to the aqueous liquor at periods determined by the temperature of the aqueous liquor discharged from the absorber column.

Upon further study of the specification and appended claims, further objects and advantages of this invention will become apparent to those skilled in the art.

DETAILED DESCRIPTION OF THE PREFERRED EMBODIMENTS

In the method of the invention, a gaseous effluent containing NO$_x$ is contacted with an aqueous liquor so as to condense the NO$_x$ gases therein. The aqueous liquor which contacts the gaseous effluent is preferably a moving stream. The aqueous liquor can be in the form of a fixed bath where the gaseous effluent can overcome the back pressure and pass through the bath. Preferably, the gaseous effluent and stream of aqueous liquor are in countercurrent flow with the aqueous liquor flowing down through an absorber column and contacting a rising gaseous effluent therein. While other liquid absorption media can be used, water is the most practical because of cost and because it is not harmful to the environment.

Preferably, the gaseous effluent and aqueous liquor are fed into an absorber column, contact each other and are then discharged from the absorber column. In preferred embodiments, the discharged aqueous liquor is circulated back to the absorber column after treatment. The process and apparatus of this invention are suitable for use with any gaseous effluent where a conventional water absorber provides adequate removal of NO$_x$ at average emission rates. The gaseous effluents from metal dissolution processes using hot nitric acid are some of the effluents suitably treated by the process and apparatus of this invention. The process of this invention will reduce the NO$_x$ concentration within gaseous effluents to less than 3,000 ppm, preferably less than 500 ppm, even where the gaseous effluent has peak NO$_x$ emissions in excess of 100,000 ppm at flow rates greater than 100 SCFM. This pretreatment (prior to final scrubbing steps) accounts for a total reduction of $NO_x$ on the order of 100:1, and occurs at the source of the emission.

Hydrogen peroxide is selectively added to the aqueous liquor which contacts the gaseous effluent. Hydrogen peroxide can be added before or during contact with the gaseous effluent. Preferably, the hydrogen peroxide is added to the aqueous liquor before formation of the stream. Where an absorber column is used, the hydrogen peroxide is preferably added before introduction of the aqueous liquor to the absorber column. The hydrogen peroxide added is in solution which can be of the concentrations available commercially. Hydrogen peroxide is available at concentrations typically up to about 50 wt.%. Hydrogen peroxide solutions with concentrations much higher or much lower than 50 wt.% are also suitable. High concentrations are desirable so as to minimize the material handling necessary to obtain the desired concentration of hydrogen peroxide in the aqueous liquor. The hydrogen peroxide concentration within the aqueous liquor can vary widely but preferably falls within the range of about 0.5-10% by weight, most preferably 1-5 wt.%. Lower levels provide little enhancement in absorbing $NO_x$ over water alone and higher concentrations do not show further enhancement of $NO_x$ removal.

Compounds other than hydrogen peroxide can be used as the chemical treatment agent. Suitable active compounds provide a source of oxygen and are oxidizers or oxidizing agents, such as ozone. Hydrogen peroxide is the preferred active compound in that it is relatively easy to handle at commercial concentrations and its decomposition to water and oxygen leaves no detrimental effects to the environment and no downstream processing is required to remove residues. By utilizing hydrogen peroxide in the aqueous liquor, the use of prilled urea in a metal dissolution reactor can be avoided in that there is no need to tie up the nitric acid sites to reduce $NO_x$ mass transfer to the gas phase.

With the addition of hydrogen peroxide to the aqueous liquor in the absorber column, the $NO_x$ concentration in the gaseous effluent which leaves the absorber can be reduced by an additional 50-80%, depending on the concentration of $NO_x$, flow rate, reactor conditions, etc., as compared to the use of water alone. The peak $NO_x$ concentrations in gaseous effluents from metal dissolution processes have been reduced by an average of 39%, as compared to processes wherein urea is added to the reactor to reduce emissions.

A conventional pump such as one which provides an output of up to 2 gal./min. is acceptable for adding the hydrogen peroxide solution to the aqueous liquor of a conventional absorber column. Preferably, the output of the pump can be varied to conserve hydrogen peroxide. In conventional absorber columns used for metal dissolution processes, the aqueous liquor is fed at a rate of about 2 gal./min. Feeding the hydrogen peroxide solution (50 wt.% concentration) at 0.2 gal./min. into a stream at a flow rate of 2 gal./min. is preferred and provides a hydrogen peroxide concentration of about 5 wt.% within the aqueous liquor. The feed rate can vary widely as needed and also as the size of the absorber column and stream of aqueous liquor varies.

As discussed above, it is undesirable to add hydrogen peroxide continuously at a high rate in that it is wasteful. In the present invention, hydrogen peroxide is added selectively in response to increases in the level of $NO_x$ within the gaseous effluent. Without optimizing the addition of hydrogen peroxide, consumption of hydrogen peroxide would be 10-20 times higher, thereby making the use of hydrogen peroxide uneconomical.

The hydrogen peroxide is added to the aqueous liquor by an inferential control strategy in which periods of addition are determined by the temperature of a portion of the aqueous liquor which has absorbed $NO_x$ from the gaseous effluent. Absorbing $NO_x$ results in an increase in temperature as the gas is condensed. Monitoring the temperature of the aqueous liquor which is discharged from an absorber column has been found to be a suitable control variable for adding hydrogen peroxide to the aqueous liquor. Increases in temperature of the aqueous liquor correlate well with increases in the $NO_x$ present in the gaseous effluent. Although not all temperature increases are caused by high $NO_x$ concentrations, responding to all temperature increases at certain times in the metal batch dissolution process ensures against high $NO_x$ emissions. There are few false warnings and their cost is minimal.

It is preferable to develop an algorithm which determines the appropriate time to be most sensitive to temperature changes when adding the hydrogen peroxide. To develop the algorithm, a $NO_x$ analyzer can be used to determine how temperature changes in the aqueous liquor correlate with flue gas composition, particularly the $NO_x$ concentrations. Temperature changes in the aqueous liquor which has contacted the gaseous effluent can then be monitored and the hydrogen peroxide dosed by a control means which uses the algorithm to correlate the temperature with the flue gas concentration. The temperature of the aqueous liquor can simply be monitored by a conventional in-line thermocouple and the readings sent to a conventional control means which operates a pump. This process provides more time to respond to increases in $NO_x$ concentration than offered by an $NO_x$ analyzer in that the gaseous effluent is monitored further from the flue and is preferably upstream of the point where aqueous liquor containing hydrogen peroxide is added to the absorber column. A response time of 15-60 seconds for most systems is provided. The temperature of the aqueous liquor which absorbed $NO_x$ can be monitored during or subsequent to contact with the gaseous effluent. Where an absorber column is used, the aqueous liquor temperature can be monitored by installing a thermocouple within the absorber or preferably in the discharge line from the aqueous liquor.

Depending on the algorithm developed, the control means can add hydrogen peroxide intermittently in response to temperature changes in the aqueous liquor or continuously, with the dosage varying significantly with temperature, or a combination of both. The algorithm may establish different parameters at different periods in the process to avoid adding hydrogen peroxide where it is likely other factors have caused an increase in the temperature of the aqueous liquor. Requiring a temperature increase of 1° F./10 sec. in the aqueous liquor has shown to be effective in controlling the peak $NO_x$ emissions from batch metal dissolution processes when nitric acid is introduced. At other periods, maintaining a maximum temperature of 100° F. for the aqueous liquor has been effective.

Figure 1:
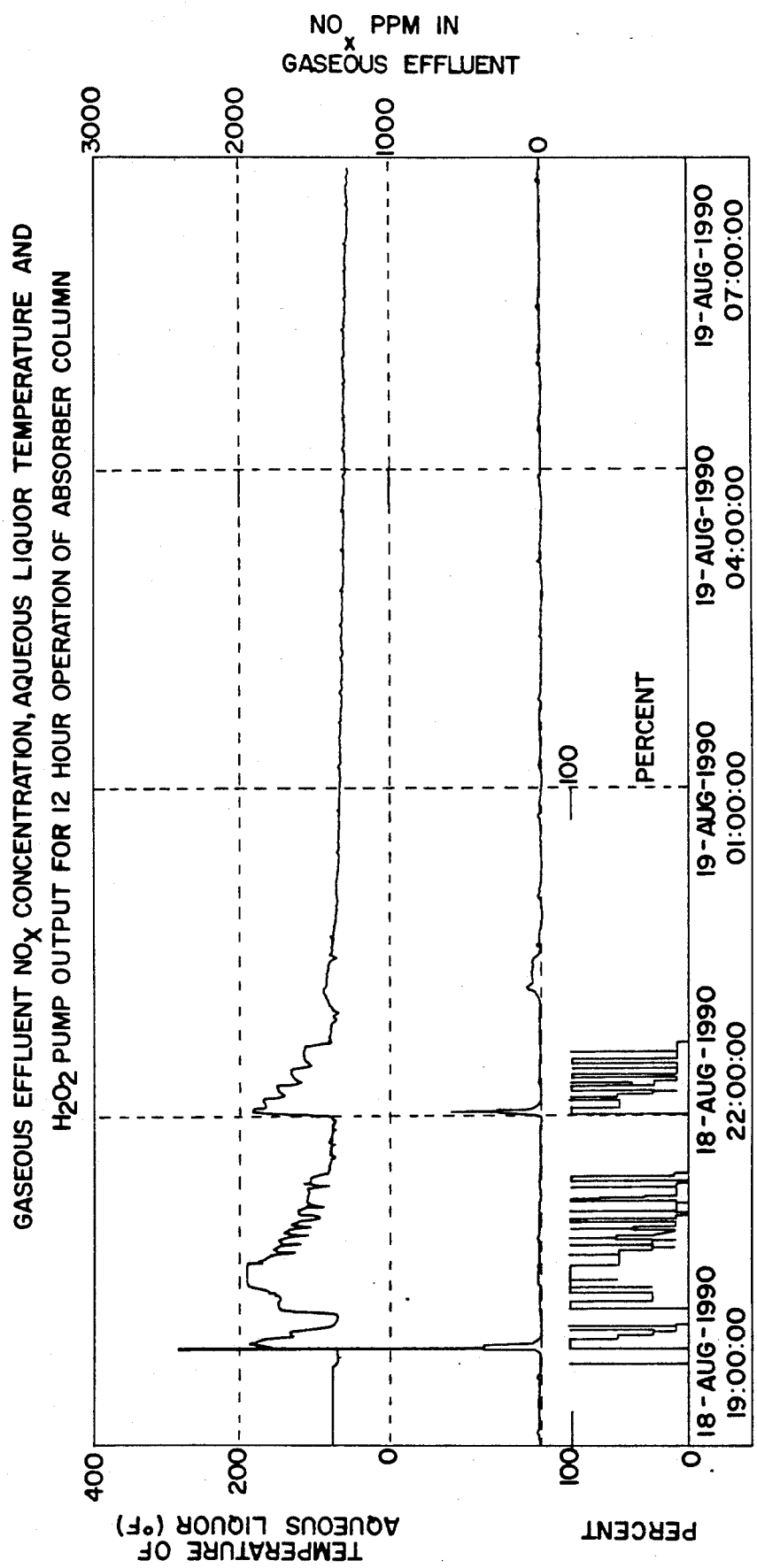
FIG. 1 is a graphical representation of the status of a batch metal dissolution reaction and the gaseous effluent therefrom over a 12-hour period.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

Example 1

A metal dissolution plant comprising a stainless steel reactor with a conventional absorber column positioned to receive gaseous effluent, is modified to provide an apparatus that performs the process of the present invention. Within the absorber column, an aqueous liquor is sprayed over two beds of ceramic packing, at a rate of 2.0 gal./min. for each bed, to scrub the gaseous effluent therein. The two beds are 30" in length and comprise $\frac{3}{8}$" ceramic saddles. Short conduit connections feed the gaseous effluent from the reactor to the absorber and discharge the gaseous effluent to other scrubbers. Two separate conduits ($\frac{1}{2}$ in.) feed the aqueous liquor to the sprayers over the ceramic packing. A 2-inch line discharges the aqueous liquor near the bottom of the absorber. The absorber column is packed with 2 beds, 30" in length, each of $\frac{3}{8}$" ceramic saddles.

The apparatus is modified by installing a "type J" thermocouple at the outlet for the aqueous liquor approximately 3 feet from the absorber. A hydrogen peroxide feed is also added which comprises a diaphragm metering pump with feed and discharge lines. The discharge line from the pump is connected to the aqueous liquor feed for the lower sprayer in the absorber and is installed about 6-8 feet upstream of the absorber column. The feed line for the pump is connected to a 500 gal. tank having 50% hydrogen peroxide solution obtained from Interox. A controller (G.E. Series 6 Controllable Programmer) is used to accept readings from the thermocouple and switch the pump on and off. At 100% output, the pump provides a flow rate of 2 gal./min. The controller reduces the output of the pump at increments of about 10-25% of the maximum as the temperature of the aqueous liquor decreases.

The controller is programmed with an algorithm that starts the pump at temperature increases of 1° F./30 sec. detected by the thermocouple when nitric acid is added to the reactor. When nitric acid is not being added, the controller is programmed to respond to any temperature greater than 100° F. The algorithm has the pump respond at 100% output initially and then step down in output as temperature decreases until the pump is stopped.

Although not part of the apparatus, a Chemi Luminescent analyzer (Teco Analyzer by Thermo Environmental Instruments, Inc.) is positioned over the absorber stack to confirm the concentration of the $NO_x$ emissions in performing the following test.

A batch metal (iron/nickel) dissolution process in hot nitric acid is performed for a 12-hour period, over which the temperature of the aqueous liquor exiting the absorber column is determined. Initial readings are found to be between 60° and 70° F. $NO_x$ discharges are determined to be 0 ppm over most of this period by the $NO_x$ analyzer. After about 1 hour of operation, nitric acid is introduced and the $NO_x$ analyzer detects a discharge of about 2,500 ppm $NO_x$. An increase in the temperature of the aqueous stream is detected by the thermocouple at the same time. The temperature increases from about 60°-70° F. to approximately 180°-190° F. The controller responds with 100% pump output providing 0.2 gal./min. of 50% hydrogen peroxide, resulting in a total concentration of hydrogen peroxide of about 5 wt.% within the stream of aqueous liquor flowing at a rate of 2 gal./min. through the lower ceramic bed. The pump output varies intermittently as the temperature of the aqueous effluent decreased. The pump is finally shut off after the aqueous effluent returned to a temperature of about 60°-65° F. About 2 hours following the introduction of the hydrogen peroxide, the $NO_x$ concentration detected by the analyzer in the stack is determined to be about 0 ppm.

Additional charges of nitric acid were introduced over the 12-hour period. The performance of the above apparatus while receiving a gaseous effluent from a batch metal dissolution process over 12 hours is summarized in FIG. 1. FIG. 1 shows a system that responds to increases in temperature on three occasions. In all three situations, the $NO_x$ peak emissions are short in duration, illustrating the prompt response time provided by the present invention. In two of the three responses, the magnitude of the $NO_x$ emission peak is maintained below about 750 ppm. Where the system shows the most persistent temperature increases in the aqueous liquor, the $NO_x$ emission is found to be 0 ppm by the analyzer after a very large but short $NO_x$ emission.

FIG. 1 also shows the selectivity of the algorithm in that certain minor temperature increases during the process, which were accompanied by minor increases in $NO_x$ emissions of less than 200 ppm, did not initiate a response by the controller.

The preceding examples can be repeated with similar success by substituting the generically or specifically described reactants and/or operating conditions of the process and components of the apparatus of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for removing oxides of nitrogen ($NO_x$) from a gaseous effluent within an absorber column, said method comprising;
    (a) feeding gaseous effluent and aqueous liquor into an absorber column,
    (b) contacting the gaseous effluent with the aqueous liquid within said absorber column,
    (c) discharging the gaseous effluent and aqueous liquor which have contacted from said absorber column, and
    (d) selectively adding hydrogen peroxide to the aqueous liquor fed into the absorber column at periods determined by an increase in the temperature of the aqueous liquid discharged from the absorber column of 1° F./30 seconds and above.

2. A method according to claim 1, wherein the hydrogen peroxide is added intermittently.

3. A method according to claim 1, wherein the amount of hydrogen peroxide added to the aqueous liquor is determined by the increase in the temperature of the aqueous liquor which is discharged from the absorber column.

4. A method according to claim 1, wherein the gaseous effluent has up to 100,000 ppm $NO_x$ prior to treatment and less than 1,000 ppm $NO_x$ subsequent to treatment.

5. A method according to claim 1, wherein the gaseous effluent is derived from a nitric acid metal dissolution process.

6. A method according to claim 1, wherein hydrogen peroxide added to the aqueous liquor comprises 0.5 to 10 wt.% of said aqueous liquor.

7. A method according to claim 1, wherein the hydrogen peroxide added to the aqueous liquor comprises 1 to 5 wt.% of said aqueous liquor.

8. A method according to claim 1, wherein the aqueous liquor discharged from the absorber column is recirculated into the absorber column continuously.

9. A method according to claim 5, wherein the gaseous effluent is from a metal dissolution process and the $NO_x$ emissions are maintained below 500 ppm.

10. A method for removing oxides of nitrogen ($NO_x$) from a gaseous effluent of a metal dissolution process to a level below 500 ppm, said method comprising:
(a) feeding gaseous effluent and aqueous liquor into an absorber column,
(b) contacting the gaseous effluent with the aqueous liquor within said absorber column,
(c) discharging the gaseous effluent and aqueous liquor which have contacted from said absorber column, and
(d) selectively adding hydrogen peroxide to the aqueous liquor fed into the absorber column without adding nitric acid at periods determined by an increase in the temperature of the aqueous liquor which is discharged from the absorption column of 1° F./30 seconds and above.

* * * * *